(12) United States Patent
Chang

(10) Patent No.: US 9,063,326 B2
(45) Date of Patent: Jun. 23, 2015

(54) APERTURE ADJUSTING METHOD AND DEVICE

(75) Inventor: Jong-hyeon Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/451,611

(22) Filed: Apr. 20, 2012

(65) Prior Publication Data
US 2013/0016515 A1 Jan. 17, 2013

(30) Foreign Application Priority Data
Jul. 15, 2011 (KR) ........................ 10-2011-0070664

(51) Int. Cl.
| F21V 9/10 | (2006.01) |
| F21V 29/00 | (2006.01) |
| G02B 26/00 | (2006.01) |
| G03B 9/02 | (2006.01) |
| G03B 9/08 | (2006.01) |

(52) U.S. Cl.
CPC ................ G02B 26/005 (2013.01); G03B 9/02 (2013.01); G03B 9/08 (2013.01)

(58) Field of Classification Search
CPC ........... F21V 29/22; F21V 9/10; F21V 15/01; F21V 29/22234
USPC ........................................ 362/293, 656, 647
See application file for complete search history.

(56) References Cited

U.S. PATENT DOCUMENTS

| 5,956,005 A | 9/1999 | Sheridon |
| 6,911,132 B2 | 6/2005 | Pamula et al. |
| 6,924,792 B1 | 8/2005 | Jessop |
| 6,936,809 B2 | 8/2005 | Viinikanoja |
| 6,958,132 B2 | 10/2005 | Chiou et al. |
| 6,989,234 B2 | 1/2006 | Kolar et al. |
| 7,163,612 B2 | 1/2007 | Sterling et al. |
| 7,329,545 B2 | 2/2008 | Pamula et al. |
| 7,388,650 B2 | 6/2008 | Bleeker |
| 7,408,691 B2 | 8/2008 | Hsiao |
| 7,413,306 B2 | 8/2008 | Campbell |

(Continued)

FOREIGN PATENT DOCUMENTS

| EP | 1 798 958 A1 | 6/2007 |
| JP | 2002006200 A | 1/2002 |

(Continued)

OTHER PUBLICATIONS

Communication dated Sep. 24, 2012, issued by the European Patent Office in counterpart European Application No. 12171645.0.

(Continued)

*Primary Examiner* — Joseph L Williams
(74) *Attorney, Agent, or Firm* — Sughrue Mion, PLLC

(57) ABSTRACT

An aperture adjusting device for adjusting an aperture through which light is transmitted. The aperture adjusting device includes: a chamber; a first fluid and a second fluid disposed within the chamber. The first fluid and second fluid are not mixed with each other. The first fluid transmits light and the second fluid blocks or absorbs light. A first electrode unit is disposed on an inner surface of the chamber, and includes one or more electrodes to which a voltage may be applied to form an electric field in the chamber. An aperture within the chamber through which light is transmitted is adjustable by adjusting an interfacial location between the first fluid and the second fluid by modifying the electric field.

39 Claims, 17 Drawing Sheets

(56) References Cited

U.S. PATENT DOCUMENTS

| | | |
|---|---|---|
| 7,548,363 B2 | 6/2009 | Hayes et al. |
| 7,569,129 B2 | 8/2009 | Pamula et al. |
| 7,593,153 B2 | 9/2009 | Choi |
| 7,697,187 B2 | 4/2010 | Kato et al. |
| 7,727,771 B2 | 6/2010 | Chiou et al. |
| 7,746,540 B2 | 6/2010 | Lo et al. |
| 7,763,471 B2 | 7/2010 | Pamula et al. |
| 7,791,813 B2 | 9/2010 | Cernasov et al. |
| 7,791,814 B2 | 9/2010 | Liogier D'ardhuy et al. |
| 7,872,790 B2 | 1/2011 | Steckl et al. |
| 7,898,714 B2 | 3/2011 | Hagood, IV et al. |
| 7,943,030 B2 | 5/2011 | Shenderov |
| 2003/0205632 A1 | 11/2003 | Kim et al. |
| 2004/0174610 A1 | 9/2004 | Aizenberg et al. |
| 2004/0231987 A1 | 11/2004 | Sterling et al. |
| 2006/0110580 A1 | 5/2006 | Aylward et al. |
| 2006/0132927 A1 | 6/2006 | Yoon |
| 2007/0023292 A1 | 2/2007 | Kim et al. |
| 2008/0084614 A1 | 4/2008 | Dobrusskin |
| 2008/0097143 A1 | 4/2008 | Californiaa |
| 2008/0130087 A1 | 6/2008 | Miyata et al. |
| 2008/0137213 A1 | 6/2008 | Kuiper et al. |
| 2008/0169195 A1 | 7/2008 | Jones et al. |
| 2008/0169197 A1 | 7/2008 | McRuer et al. |
| 2008/0274513 A1 | 11/2008 | Shenderov et al. |
| 2009/0046082 A1 | 2/2009 | Jacobson et al. |
| 2009/0046231 A1 | 2/2009 | Lu et al. |
| 2009/0192044 A1 | 7/2009 | Fouillet |
| 2009/0205963 A1 | 8/2009 | Medoro et al. |
| 2009/0218223 A1 | 9/2009 | Manaresi et al. |
| 2009/0260988 A1 | 10/2009 | Pamula et al. |
| 2009/0316253 A1 | 12/2009 | Fairley et al. |
| 2010/0068764 A1 | 3/2010 | Sista et al. |
| 2010/0120130 A1 | 5/2010 | Srinivasan et al. |
| 2010/0194408 A1 | 8/2010 | Sturmer et al. |
| 2010/0200094 A1 | 8/2010 | Ermakov |
| 2010/0208328 A1 | 8/2010 | Heikenfeld et al. |
| 2010/0223779 A1 | 9/2010 | Lo et al. |
| 2010/0225611 A1 | 9/2010 | Lee et al. |
| 2010/0289870 A1 | 11/2010 | Leister |
| 2010/0296148 A1 | 11/2010 | Reichelt et al. |
| 2010/0307922 A1 | 12/2010 | Wu |
| 2011/0007046 A1 | 1/2011 | Tsai et al. |
| 2011/0076734 A1 | 3/2011 | Zhou et al. |
| 2011/0084014 A1 | 4/2011 | Chen et al. |
| 2011/0086377 A1 | 4/2011 | Thwar et al. |
| 2011/0100823 A1 | 5/2011 | Pollack et al. |

FOREIGN PATENT DOCUMENTS

| | | |
|---|---|---|
| JP | 2009204686 A | 9/2009 |
| KR | 1020060129779 A | 12/2006 |
| KR | 1020080029870 A | 4/2008 |
| KR | 1020080069241 A | 7/2008 |
| KR | 1020090086028 A | 8/2009 |

OTHER PUBLICATIONS

"An Optofluidic Concept for a Tunable Micro-iris", Philipp Muller et al., Journal of Microelectromechanical Systems, vol. 19, No. 6, Dec. 2010, p. 1477-1484.

Research Highlights, Nature, vol. 464, Apr. 29, 2010, p. 1249.

"A microfluidic platform for complete mammalian cell culture". Irene Barbulovic-Nad, et al., Lab on a Chip, vol. 10, No. 12, Jun. 21, 2010, p. 1536-1542.

"Video-speed electronic paper based on electrowetting", Robert A. Hayes et al., Nature, vol. 425, Sep. 25, 2003, p. 383-385.

"Developing optofluidic technology through the fusion of microfluidics and optics", Demetri Psaltis et al., Nature, vol. 442, Jul. 27, 2006, p. 381-386.

"Liquid lenses make a splash", Duncan Graham-Rowe, Nature Photonics, Sep. 2006, p. 2-4.

"Electrofluidic displays using Young-Laplace transposition of brilliant pigment dispersions", J. Heikenfeld, Nature Photonics, Apr. 26, 2009, p. 292-296.

"Optofluidic variable aperture", Yu Hongbin et al., Optics Letters, vol. 33, No. 6, Mar. 15, 2008, p. 548-550.

"Circular dielectric liquid iris", C. Gary Tsai et al., Optics Letters, vol. 35, No. 14, Jul. 15, 2010, p. 2484-2486.

"Sliding-blade MEMS iris and variable optical attenuator", R R A Syms et al., Journal of Micromechanics and Microengineering, Sep. 14, 2004, p. 1700-1710.

APERTURE ADJUSTING METHOD AND DEVICE

CROSS-REFERENCE TO RELATED APPLICATION

This application claims priority from Korean Patent Application No. 10-2011-0070664, filed on Jul. 15, 2011, in the Korean Intellectual Property Office, the disclosure of which is incorporated herein in its entirety by reference.

BACKGROUND

1. Field

Apparatuses and methods consistent with exemplary embodiments related to adjusting an aperture through which light is transmitted using a microelectrofluidic method.

2. Description of the Related Art

Devices, such as aperture diaphragms or shutters, for adjusting and controlling light transmittance, are used in apparatuses for capturing images, or in image display apparatuses in order to drive pixels.

A related art variable aperture diaphragm operates a plurality of metal blades; however, mechanical movement, frictional force, and usage of movable mechanical components are obstacles in reducing a size of the optical system.

A micro-electromechanical system (MEMS) aperture diaphragm of an electrothermal type or an electrostatic type has been suggested; however, drawbacks are that the aperture is non-circular, there is a gap between blades, and the largest aperture ratio with respect to an entire device area is 1% or less.

On the other hand, since optofluidic technology combining micro-optics and microfluidics has been developed, a variable aperture diaphragm that adjusts an aperture ratio by transforming a poly-dimethylsiloxane (PDMS) membrane using air pressure has been suggested. The resolution of the variable aperture diaphragm may be improved using a three-dimensional (3D) structure and a capillary force. The variable aperture diaphragm has a higher aperture ratio than that of the MEMS aperture diaphragm; however, a syringe pump has to be used to drive the variable aperture diaphragm.

In addition, an aperture diaphragm using a liquid lens operated by a dielectric force has been recently suggested, and an aperture ratio of the aperture diaphragm may be adjusted only by electric wires formed at a bottom of the aperture without using an external driving pump.

SUMMARY

One or more exemplary embodiments provide are aperture adjusting methods and devices capable of adjusting an aperture through which light is transmitted in a microelectrofluidic method.

Additional aspects will be set forth in part in the description which follows and, in part, will be apparent from the description, or may be learned by practice of the described exemplary embodiments.

According to an aspect of an exemplary embodiment, an aperture adjusting device includes: a chamber; a first fluid and a second fluid disposed within the chamber, wherein the fluids are not mixed with each other, the first fluid is a light transmitting fluid, and the second fluid is a light blocking or absorbing fluid. A first electrode unit is disposed on an inner surface of the chamber, and includes one or more electrodes to which a voltage may be applied to form an electric field in the chamber. An aperture through which light is transmittable is adjustable by adjusting an interfacial location between the first fluid and the second fluid by modifying the electric field.

One of the first fluid and the second fluid may be a liquid metal or a polar liquid, and the other may be a vapor or a non-polar liquid.

The chamber may define an interior space including: a channel region wherein the aperture is defined according to a change of the interfacial location within the channel region; and a reservoir region which stores at least one of the first fluid and the second fluid moved from the channel region according to the change of the interfacial location.

The chamber may include: a first substrate on which the first electrode unit is disposed; a second substrate facing the first substrate and separated from the first substrate in a first direction; and a barrier wall disposed on the first substrate and separated from the second substrate in a second direction different from the first direction.

The chamber may define an interior space including: a first channel; and a second channel connected to the first channel at an upper portion of the first channel, wherein the range of the aperture is defined by the change of the interfacial location between the first fluid and the second fluid in each of the first channel and the second channel.

A height of the second channel may be equal to or greater than a height of the first channel.

The chamber may include: a first substrate on which the first electrode unit is disposed; a second substrate facing the first substrate and separated from the first substrate in a predetermined direction; a third substrate facing the second substrate and separated from the second substrate in the predetermined direction; and a barrier wall facing at least a side of the second substrate, and separated from the second substrate.

The first channel may include: a first substrate on which the first electrode unit is formed; a second substrate separated from the first substrate, and including a first through hole in a center portion thereof and at least one second through hole in a peripheral portion thereof; and a first spacer disposed between the first substrate and the second substrate.

The second channel may be defined by the second substrate, a third substrate separated from the second substrate, and a second spacer disposed between the second substrate and the third substrate.

An opaque pattern unit that may block the light transmitted through the first channel and the second channel may be formed on a center portion of the third substrate. The opaque pattern unit may have a size corresponding to a minimum size of the aperture that is defined by the movement of the first fluid and the second fluid.

A grounding electrode unit contacting a polar fluid among the first fluid and the second fluid may be further disposed in a space defined by the first channel and the second channel.

According to an aspect of another exemplary embodiment, an imaging apparatus includes: an aperture adjusting device; a focusing unit which focuses an image of an object from light incident through the aperture adjusting device; and an imaging device which converts the image formed by the focusing unit into an electric signal.

According to an aspect of another exemplary embodiment, an image display apparatus includes: a light source unit which emits light; and a display panel which adjusts a transmittance of the light emitted from the light source unit according to image information, the display panel including an array of a plurality of aperture adjusting devices in.

The display panel may include: a first aperture adjusting device, in which the first fluid is a first color; a second aperture adjusting device, in which the first fluid is a second color different from the first color; and a third aperture adjusting device, in which the first fluid is a third color different from the first color and the second color.

The image display apparatus may further include a color filter disposed on a light output face of the display panel, the color filter including a plurality of color regions corresponding to the plurality of aperture adjusting devices.

According to an aspect of another exemplary embodiment, an aperture adjusting method includes: disposing a first fluid and a second fluid in a chamber such that the first fluid and the second fluid are not mixed with each other, wherein the first fluid transmits light and the second fluid blocks or absorbs light and wherein an electrode unit, comprising an array of one or more electrodes, is disposed in the chamber; and selectively applying a voltage to at least one of the one or more electrodes, thereby adjusting an aperture through which light is transmitted by moving an interface between the first fluid and the second fluid.

The chamber defines an interior space within which the first fluid and the second fluid are disposed, the interior space including: a channel region wherein the aperture is defined according to a movement of the interface within the channel region; and a reservoir region which stores at least one of the first fluid and the second fluid moved from the channel region according to the movement of the interface.

The chamber may define: a first channel; and a second channel connected to the first channel at an upper portion of the first channel, wherein a range of the aperture is defined by a movement of the interface between the first fluid and the second fluid in each of the first channel and the second channel.

A path connecting the first and second channels to each other may be formed by at least one of a through hole disposed at a center portion of the chamber and at least one through hole disposed at a peripheral portion of the chamber.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
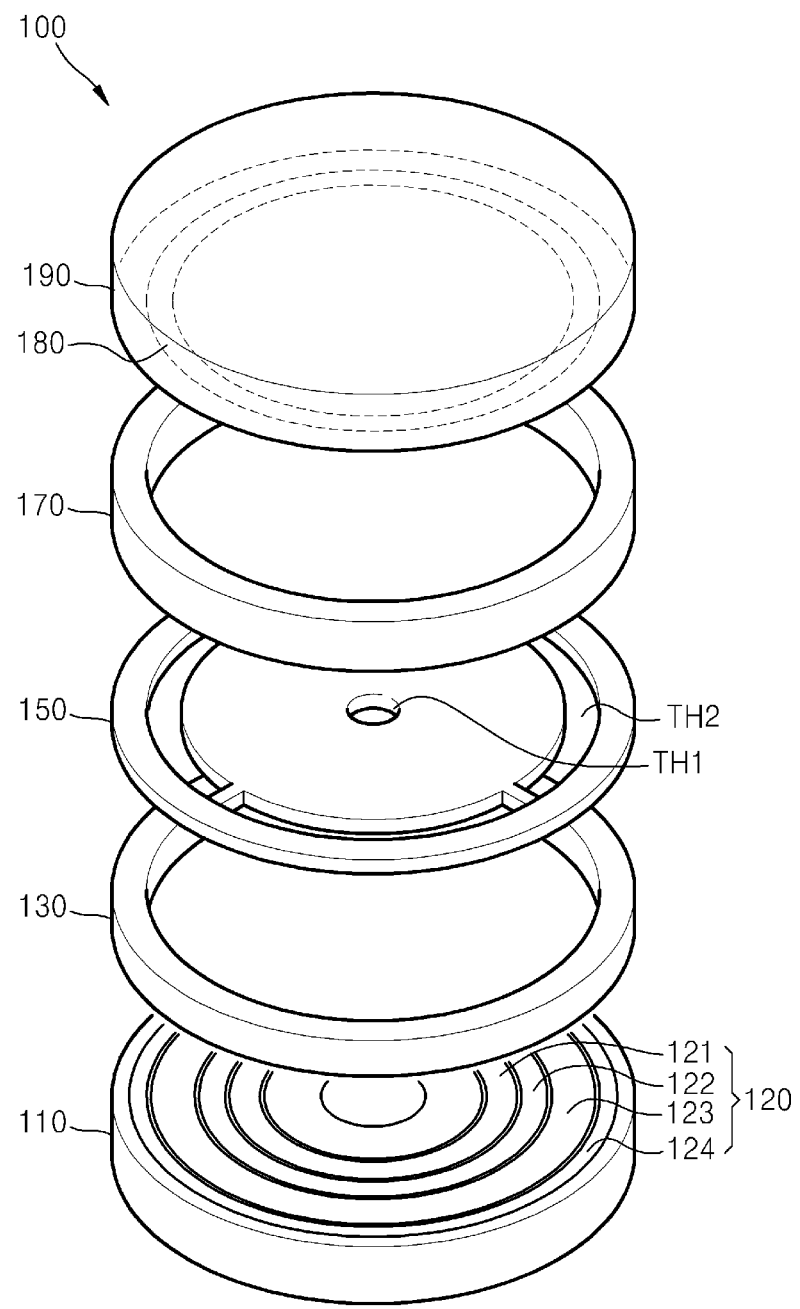
FIG. 1 is an exploded perspective view of an aperture adjusting device according to an exemplary embodiment.

Reference will now be made in detail to exemplary embodiments which are illustrated in the accompanying drawings, like reference numerals refer to like elements throughout. The described exemplary embodiments may have different forms and should not be construed as being limited to the descriptions set forth herein.

According to an aperture adjusting method of an exemplary embodiment, a first fluid and a second fluid, one of which is formed of a light transmitting material and the other of which is formed of a light blocking or light absorbing material and which are not mixed with each other, are disposed in a chamber including an electrode portion in which one or more electrodes form an array, and a voltage is selectively applied to some of the one or more electrodes to move an interface between the first and second fluids so as to adjust an aperture through which the light is transmitted.

An aperture adjusting device executing the above aperture adjusting method may be one of various types according to a structure of the chamber that provides a flow space for the fluids and a structure of arranging the electrodes for forming an electric field in the chamber.

Figure 2:
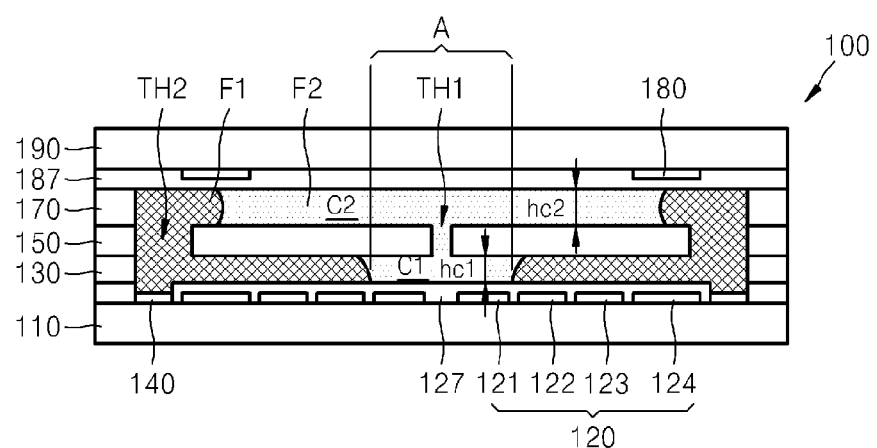
FIG. 2 is a schematic cross-sectional view of the aperture adjusting device shown in FIG. 1.

FIG. 1 is an exploded perspective view of an aperture adjusting device 100 according to an exemplary embodiment, and FIG. 2 is a cross-sectional view schematically showing the aperture adjusting device 100 of FIG. 1. Some components in the aperture adjusting device 100 are omitted from FIG. 1 for convenience of illustration.

Referring to FIGS. 1 and 2, the aperture adjusting device 100 includes a first channel C1 and a second channel C2, disposed above the first channel C1 and connected to the first channel C1. In addition, a first fluid F1 and a second fluid F2 that may flow within the first channel C1 and the second channel C2 are disposed respectively in the first and second channels C1 and C2. The first fluid F1 and the second fluid F2 are not mixed with each other, and one of the first and second fluids F1 and F2 transmits light and the other blocks or absorbs light. In addition, an electrode unit to which a voltage can be applied is disposed for forming an electric field that controls a surface tension of an interface between the first and second fluids F1 and F2. Thus, a size of the aperture A is changed according to the flow of the first and second fluids F1 and F2 and, accordingly, a transmittance of incident light is adjustable.

Structures and operations of the aperture adjusting device 100 will be described in more detail as follows.

The first and second channels C1 and C2 form a fluid chamber, and paths which connect the first and second channels C1 and C2 to each other are formed at an edge of the chamber and at the center of the chamber. A height hc2 of the second channel C2 may be equal to or higher than a height hc1 of the first channel C1. When the height hc2 of the second channel C2 is greater than the height hc1 of the first channel C1, an aperture ratio with respect to a width of the channel increases, and when the height hc2 of the second channel C2 is equal to the height hc1 of the first channel C1, a driving speed of the aperture adjusting device 100 increases.

In more detail, the first channel C1 is formed by a first substrate 110, a second substrate 150 that is separated from the first substrate 110 and includes a first through hole TH1 in a center portion thereof and a second through hole TH2 in a peripheral portion thereof, and a first spacer 130 that is formed between the first and second substrates 110 and 150 so as to form an inner space. In addition, the second channel C2 is formed by the second substrate 150, a third substrate 190 that is separated from the second substrate 150, and a second spacer 170 disposed between the second and third substrates 150 and 190 so as to form an inner space. A cross-sectional area of the first through hole TH1 is less than that of the second through hole TH2; however, embodiments are not limited thereto.

The first substrate 110, the second substrate 150, and the third substrate 190 may be formed of a light transmitting material.

The first fluid F1 blocks or absorbs the light, and is disposed in an edge portion of the chamber. The first fluid F1 may be a liquid metal or a polar liquid. For example, the first fluid F1 may be a liquid metal such as Hg, or a solution in which a dye is dissolved according to a light absorbing wavelength band. The dye may be, for example, carbon black which absorbs a visible ray band, Epolight™2717 of Epoline, Corp. that is a near-infrared ray absorbing dye having a maximum light absorbing wavelength of about 968 nm, or NIR1054B of QCR Solution, Corp. that is a near-infrared ray absorbing dye having a maximum light absorbing wavelength of about 1054 nm.

The second fluid F2 is a light transmitting fluid that is not mixed with the first fluid F1, and is disposed in a center portion of the chamber. For example, the second fluid F2 may be a gas or a non-polar liquid.

The first fluid F1 and the second fluid F2 form fluid interfaces in the first and second channels C1 and C2, and a size of the aperture A is adjusted by the movement of the fluid interfaces, which will be described later.

The electrode unit includes a first electrode unit 120 having one or more electrodes formed on the first substrate 110, and a second electrode unit 180 having one or more electrodes formed on the third substrate 190. The first electrode unit 120 and the second electrode unit 180 are coated with an insulating material, for example, a first dielectric layer 127 covers the first electrode unit 120 and a second dielectric layer 187 covers the second electrode unit 180.

The first electrode unit 120 may include one or more electrodes for digital-control of the aperture A. For example, as shown in FIG. 1, the first electrode unit 120 may include a plurality of electrodes 121, 122, 123, and 124 that are formed as concentric rings having different radiuses. The second electrode unit 180 may also include one or more electrodes. For example, the second electrode unit 180 may include annular electrodes as shown in FIG. 1. However, the shapes and the number of electrodes included in the first electrode unit 120 and the second electrode unit 180 are not limited to the above examples.

A grounding electrode unit 140 may be disposed in the chamber so as to maintain a contacting state with the polar liquid, for example, the first fluid F1. As shown in FIG. 2, the grounding electrode unit 140 may be disposed on the first substrate 110.

The electrodes included in the first electrode unit 120 and the second electrode unit 180 may be formed of a transparent conductive material, for example, a metal oxide such as indium tin oxide (ITO) or indium zinc oxide (IZO), a thin film in which metal nano-particles such as Au or Ag are dispersed, a carbon nano-structure such as carbon nanotubes (CNT) or graphene, or a conductive polymer such as poly(3,4-ethylenedioxythiophene) (PEDOT), polypyrrole(PPy), or poly(3-hexylthiophene)(P3HT).

Due to its location, the grounding electrode unit 140 does not need to transmit light and may be formed of a metal thin film such as Au, Ag, Al, Cr, or Ti.

In the aperture adjusting device 100, the size of the aperture A changes when the interface between the first fluid F1 and the second fluid F2 moves toward or away from a center portion of the aperture adjusting device 100 in accordance with the electrowetting phenomenon based on a difference between heights of the first channel C1 and the second channel C2, and a difference between diameters of the first through hole TH1 and the second through hole TH2.

Figure 3A:
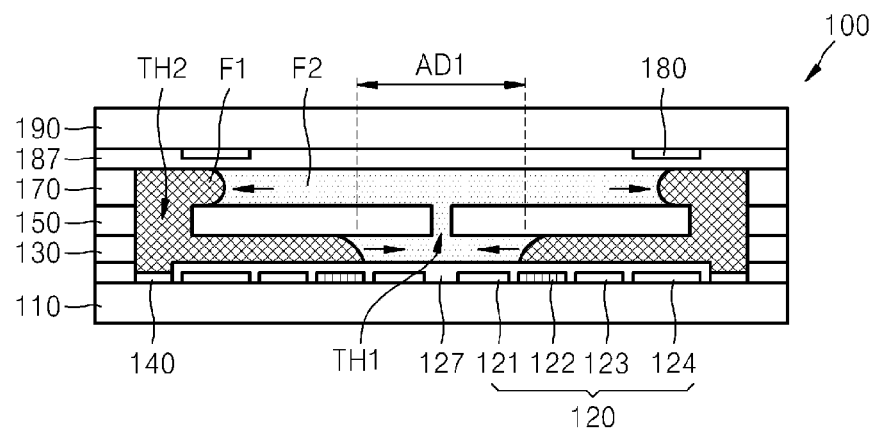
FIGS. 3A and 3B are cross-sectional views illustrating operations of adjusting an aperture by the aperture adjusting device shown in FIG. 1, in which apertures of different sizes are formed.
Figure 3B:
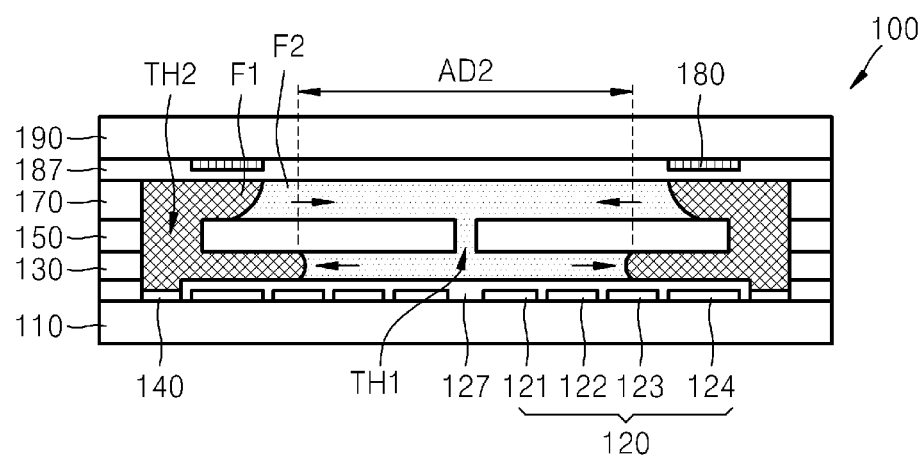

FIGS. 3A and 3B are cross-sectional views illustrating an operation of adjusting the light transmittance of the aperture adjusting device 100 of FIG. 1. FIGS. 3A and 3B show different aperture diameters AD1 and AD2 formed in the aperture adjusting device 100.

The electrowetting phenomenon is a phenomenon whereby a contact angle of an electrolyte droplet on an electrode coated with an insulating material is changed when a voltage is applied to the droplet. That is, on a three-phase contact line (TCL) at which the fluid, the droplet, and the insulating material contact each other, a contact angle therebetween changes according to an interfacial tension. When the electrowetting phenomenon is used, movement of the fluid may be controlled effectively using a low voltage, and the fluid may be conveyed and controlled reversibly.

When an appropriate voltage is applied to one electrode in the first electrode unit 120, an electromechanical force is applied to a TCL, which, in this case is a tangent at which the first fluid F1, the second fluid F2, and the first dielectric layer 127 contact each other, on an activated driving electrode, for example, the electrode 122. Then, the first fluid F1 moves toward the center portion through the first channel C1, and the aperture A is reduced. In addition, an aperture diameter AD1 is formed as shown in FIG. 3A.

When an appropriate voltage is applied to the second electrode unit 180, the first fluid F2 is moved toward the center portion through the second channel C2. Then, the TCL in the first channel C1 is pushed toward the edge, and the aperture A is increased. Thus, an aperture diameter AD2 is formed as shown in FIG. 3B.

Here, when the first electrode 120 includes the plurality of concentric ring electrodes 121, 122, 123, and 124, the aperture size may be controlled in a digital way by changing the activated electrode.

In the above description, the first fluid F1 that blocks or absorbs the light has a polar property and the second fluid F2 that transmits the light has a non-polar property; however, the first fluid F1 that blocks or absorbs the light may have the non-polar property and the second fluid F2 that transmits the light may have the polar property. In this case, the aperture A is opened/closed in an opposite way to the above description. That is, when the voltage is applied to the first electrode unit 120, the aperture A is increased, and when the voltage is applied to the second electrode 180, the aperture A is reduced.

FIGS. 4A through 4E are diagrams showing exemplary arrangements of electrodes in the first electrode unit 120, which may be adopted in the aperture adjusting device 100 of FIG. 1.

Figure 4A:
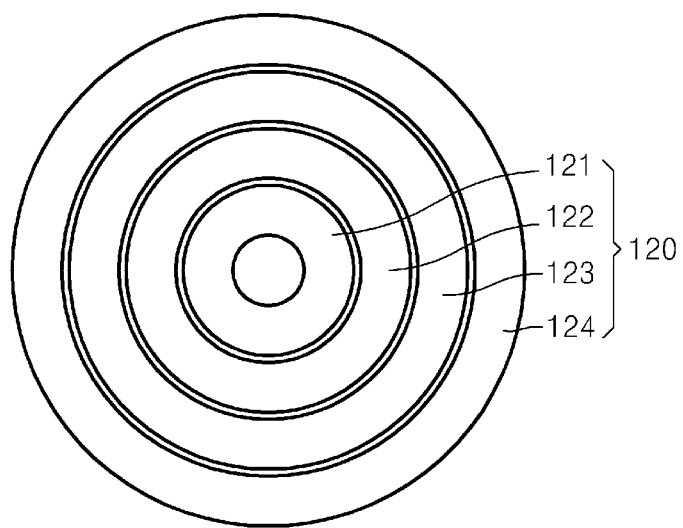
FIGS. 4A through 4E are diagrams showing exemplary arrangements of electrodes in an electrode unit that may be use in the aperture adjusting device of FIG. 1.
Figure 4B:
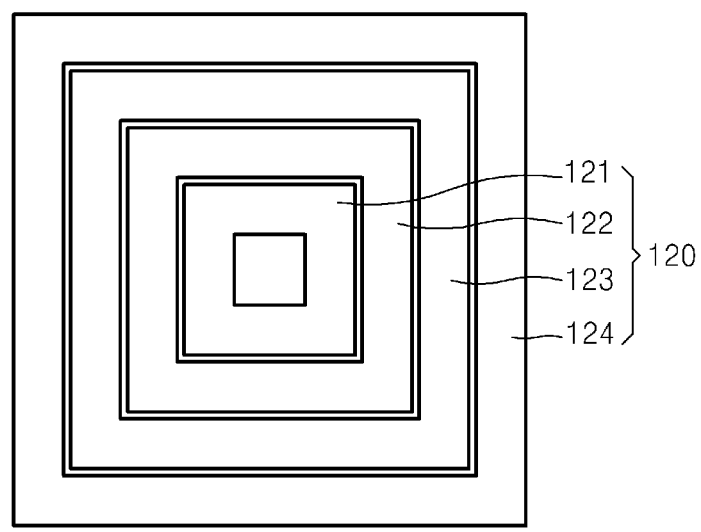
Figure 4C:
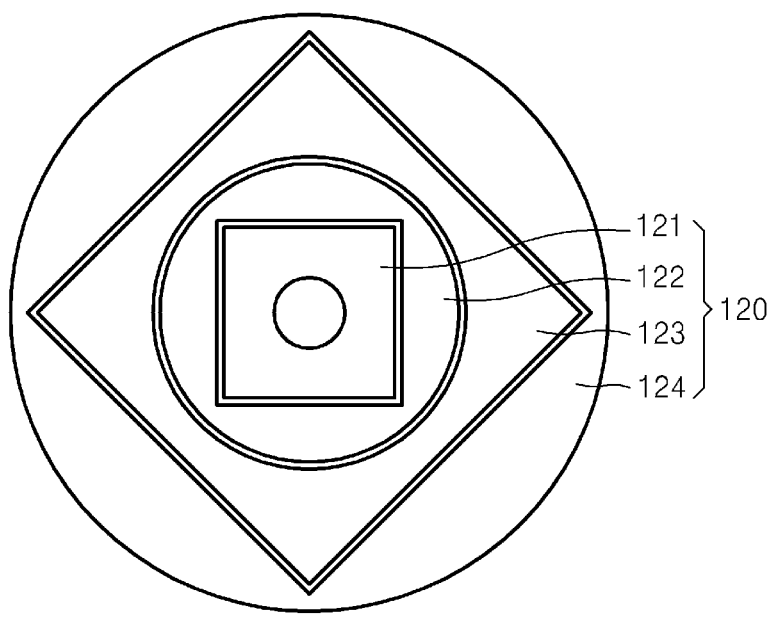
Figure 4D:
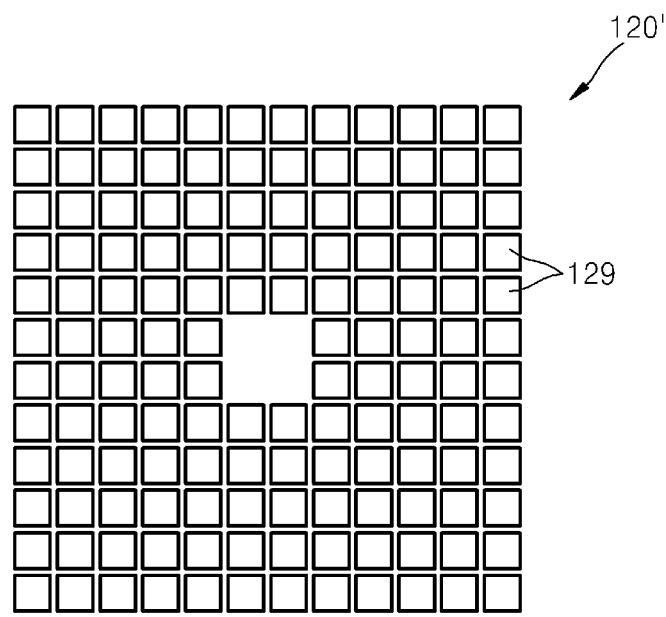
Figure 4E:
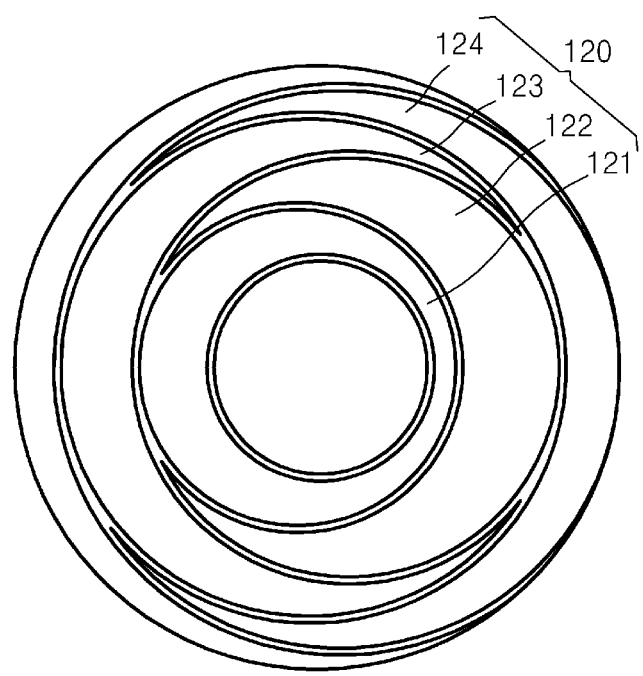

FIGS. 4A and 4B respectively show that the first electrode 120 includes circular and square loop electrodes 121, 122, 123, and 124. FIG. 4C shows the first electrode unit 120 including loop electrodes 121, 122, 123, and 124 having square and circular inner and outer circumferences. The loop electrodes 121, 122, 123, and 124 are concentric; however, the loop electrodes 121, 122, 123, and 124 may have centers located at different points. For example, electrodes 121, 122, 123, and 124 are disposed as shown in FIG. 4D. A first electrode unit 120' shown in FIG. 4D includes a plurality of fine electrodes 129 that are arranged in a two-dimensional array. Due to the arrangement of the electrodes, the size and shape of the aperture A may be variously adjusted by selecting some of the fine electrodes 129, to which the voltage is applied.

Figure 5:
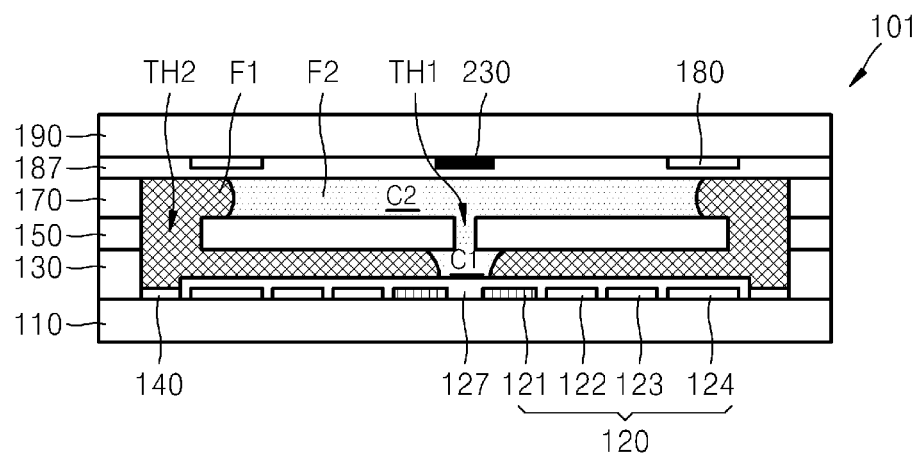
FIG. 5 is a schematic cross-sectional view of an aperture adjusting device according to another exemplary embodiment.

FIG. 5 is a schematic cross-sectional view of an aperture adjusting device 101 according to another exemplary embodiment.

The aperture adjusting device 101 of FIG. 5 is different from the aperture adjusting device 100 described with reference to FIGS. 1 through 3B in that the aperture adjusting device 101 may function as a shutter, the aperture of which may be completely closed. An opaque pattern portion 230 that may block the light transmitted through the first and second channels C1 and C2 is formed on a center portion of the third substrate 190. The opaque pattern unit 230 may be formed to have a size that is the same as or larger than a minimum size of the aperture that is defined by the movement of the first and second fluids F1 and F2. That is, when the electrode 121 that is located at the center portion of the first electrode unit 120 is activated and the TCL of the first channel C1 is moved toward the center portion to form the minimum size aperture, the light transmitted through the minimum size aperture is blocked by the opaque pattern unit 230.

Figure 6:
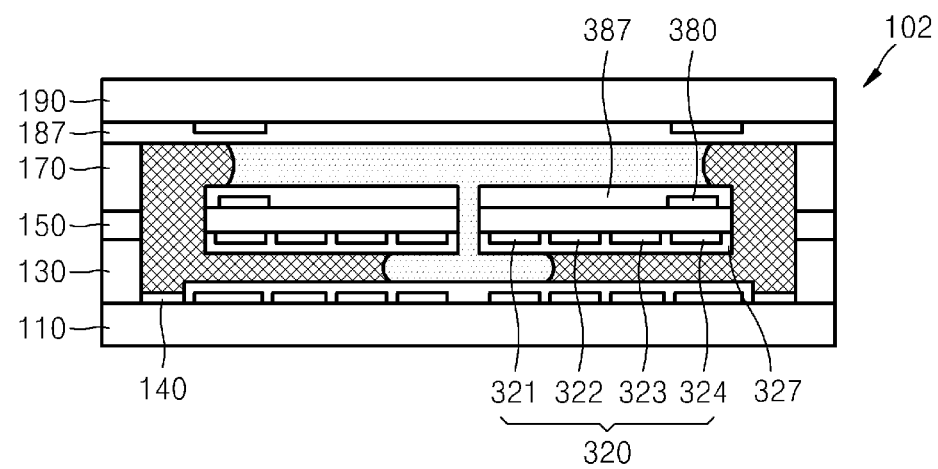
FIG. 6 is a schematic cross-sectional view of an aperture adjusting device according to another exemplary embodiment.

FIG. 6 is a schematic cross-sectional view of an aperture adjusting device 102 according to another exemplary embodiment.

The aperture adjusting device 102 of the present embodiment is different from the aperture adjusting device 100 described with respect to FIGS. 1 through 3B in that a third electrode unit 320 and a fourth electrode unit 380, each including one or more electrodes, are disposed on both surfaces of the second substrate 150. The third electrode unit 320 increases a driving force generated in the first channel C1, together with the first electrode unit 120, and the fourth electrode unit 380 increases a driving force generated in the second channel C2, together with the second electrode unit 180. The third electrode unit 320 and the fourth electrode unit 380 respectively include one or more concentric ring type electrodes. For example, the third electrode unit 320 may include a plurality of concentric ring type electrodes 321, 322, 323, and 324 having different radiuses as shown in FIG. 6. However, the number and shapes of the electrodes are not limited thereto. In addition, the third and fourth electrode units 320 and 380 are disposed on both surfaces of the second substrate 150; however, the third or fourth electrode unit 320 or 380 may be formed on only one surface of the second substrate 150.

Figure 7:
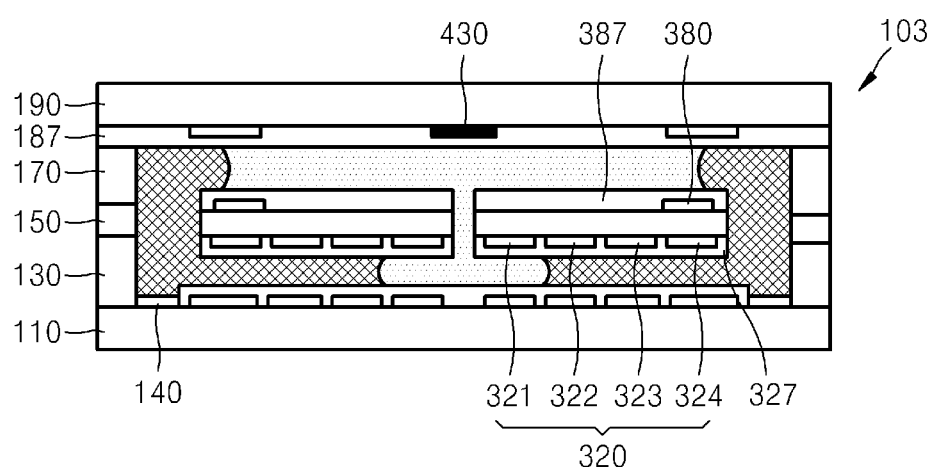
FIG. 7 is a schematic cross-sectional view of an aperture adjusting device according to another exemplary embodiment.

FIG. 7 is a schematic cross-sectional view of an aperture adjusting device 103 according to another exemplary embodiment. The aperture adjusting device 103 of the present embodiment is different from the aperture adjusting device 102 shown in FIG. 6 in that an opaque pattern unit 430 is further formed so as to enable the aperture adjusting device to function as a shutter by completely closing the aperture.

Figure 8A:
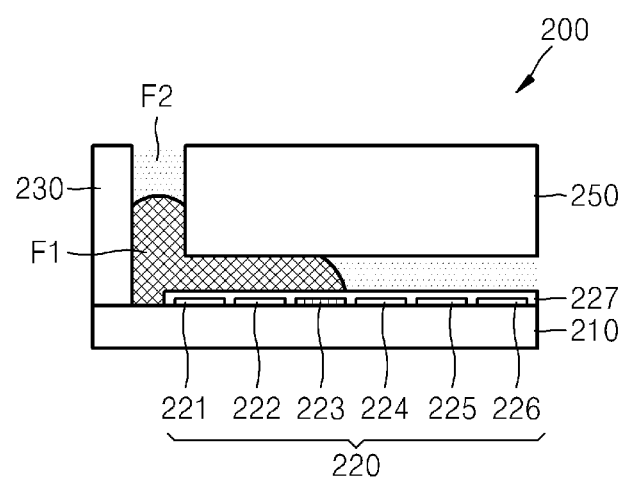
FIGS. 8A and 8B are schematic cross-sectional views of an aperture adjusting device according to another exemplary embodiment, in which apertures of different sizes are formed.
Figure 8B:
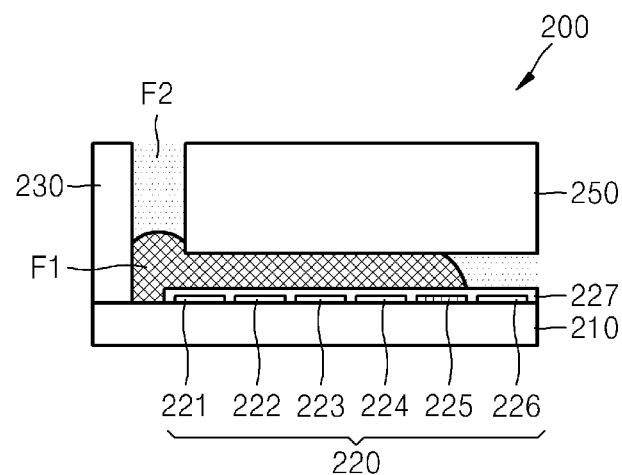
Figure 9:
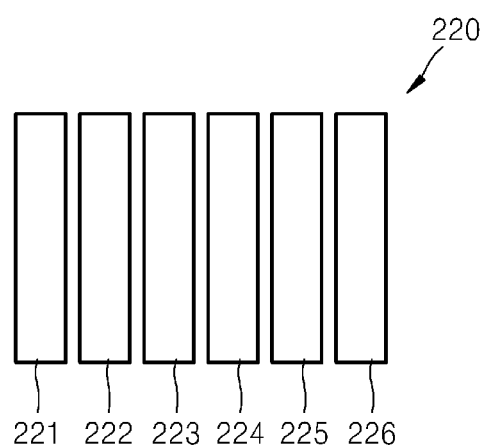
FIG. 9 is a diagram showing an exemplary arrangement of electrodes in the aperture adjusting device of FIGS. 8A and 8B.

FIGS. 8A and 8B are cross-sectional views of an aperture adjusting device 200 according to another exemplary embodiment, in which apertures of different sizes are formed. FIG. 9 is an exemplary diagram of an arrangement of electrodes that may be adopted in the aperture adjusting device 200 of FIGS. 8A and 8B.

According to the present embodiment, a chamber providing the first and second fluids F1 and F2 with a flow space is divided into a channel region and a reservoir region. The channel region corresponds to a range of the aperture that is adjusted according to the movement of the interface between the first fluid F1 and the second fluid F2, and the reservoir region stores the fluid moved from the channel region according to the movement of the interface.

In more detail, the aperture adjusting device 200 includes a first substrate 210, a second substrate 250 facing the first substrate 210 and separated from the first substrate 210 in a predetermined direction, and a barrier wall 230 disposed on the first substrate 210 to be separated from the second substrate 250 in a direction that is different from the above predetermined direction. The barrier wall 230 may surround at least a side of a boundary of the first substrate 210. A space between the first and second substrates 210 and 250 is the channel region corresponding to the range of the aperture that is adjusted by the movement of the interface, and a space between the second substrate 250 and the barrier wall 230 is the reservoir region storing the fluid moved from the channel region.

A first electrode unit 220 includes an array of one or more electrodes 221, 222, 223, 224, 225, and 226, and a dielectric layer 227 may cover the first electrode unit 220. The electrodes 221, 222, 223, 224, 225, and 226 are arranged as shown in FIG. 9; however, the number and shapes of the electrodes are not limited thereto.

In FIG. 8A, showing a case where a voltage is applied to the electrode 223, and in FIG. 8B, showing a case where the voltage is applied to the electrode 225, locations of the interface between the first and second fluids F1 and F2 differ. The first fluid F1, that blocks or absorbs the light and has a polar property, flows from the reservoir region to the channel region, or from the channel region to the reservoir region according to selecting of the electrode to which the voltage is applied, and accordingly, the aperture varies. The aperture adjusting device 200 having the above structure may operate in another reservoir (not shown) filled with the second fluid F2.

In the drawings, the first electrode unit 220 is formed on a lower portion of the channel region; however, exemplary embodiments are not limited thereto. That is, one or more electrodes may be further disposed on an upper portion of the channel region, that is, a lower surface of the second substrate 250.

Figure 10A:
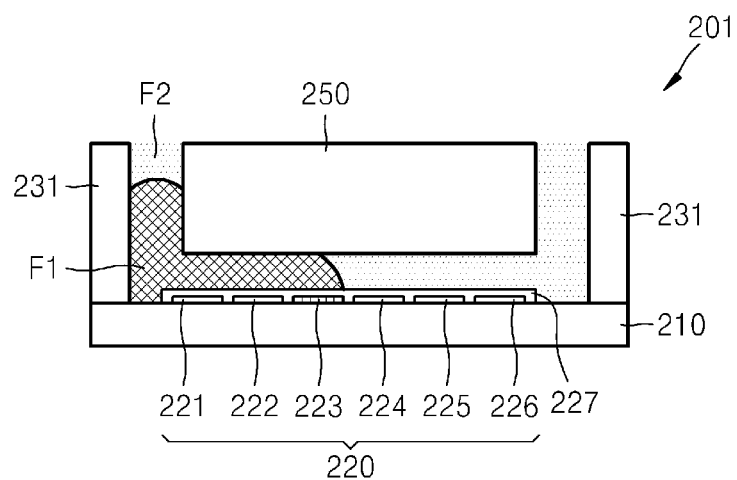
FIGS. 10A and 10B are schematic cross-sectional views of an aperture adjusting device according to another exemplary embodiment, in which apertures of different sizes are formed.
Figure 10B:
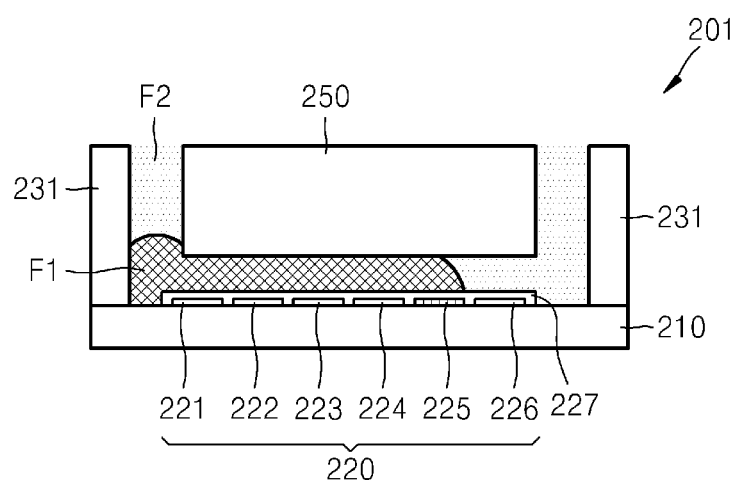

FIGS. 10A and 10B are schematic cross-sectional views of an aperture adjusting device 201 according to another embodiment of the present invention, and show apertures of different sizes.

The aperture adjusting device 201 of the present embodiment is different from the aperture adjusting device 200 shown in FIGS. 8A and 8B in that a barrier wall 231 is formed to surround the second substrate 250 along a boundary of the first substrate 210. Like the aperture adjusting device 200 of FIGS. 8A and 8B, the aperture may be adjusted by the movement of the interface between the first and second fluids F1 and F2 according to the selection of the electrode to which the voltage is applied, and the aperture adjusting device 201 may operate in another reservoir (not shown) filled with the second fluid F2. In addition, one or more electrodes may be disposed on a lower surface of the second substrate 250.

Figure 11A:
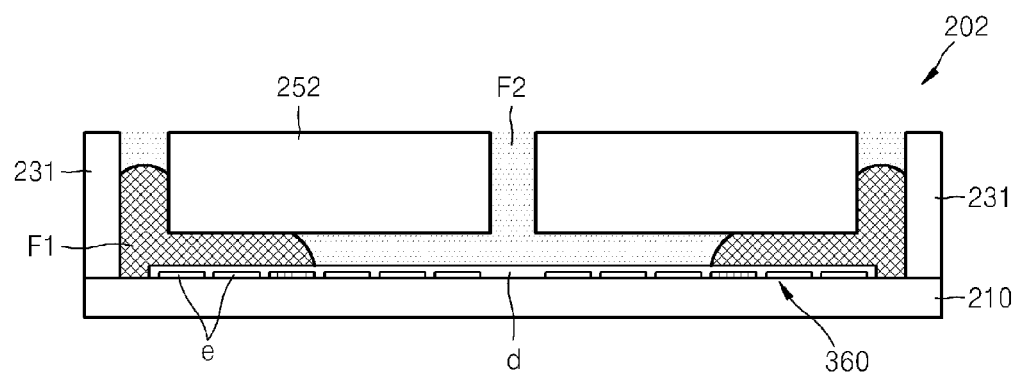
FIGS. 11A and 11B are schematic cross-sectional views of an aperture adjusting device according to another exemplary embodiment, in which apertures of different sizes are formed.
Figure 11B:
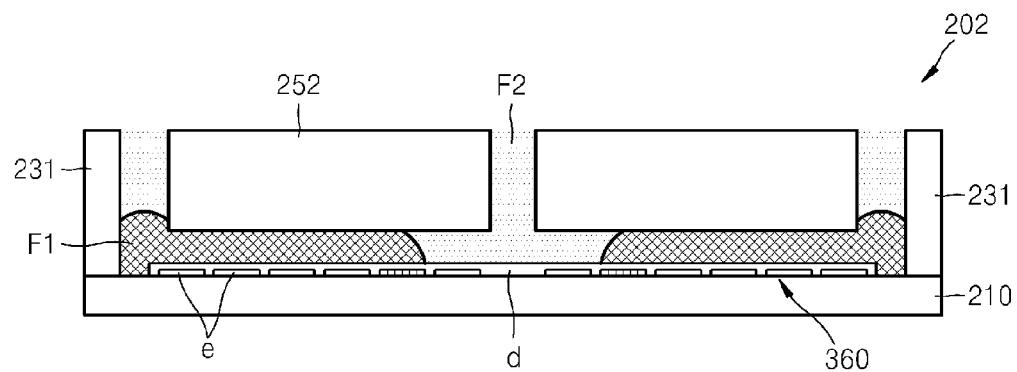

FIGS. 11A and 11B are schematic cross-sectional views of an aperture adjusting device 202 according to another exemplary embodiment, and show apertures of different sizes.

The aperture adjusting device 202 of the present embodiment is different from the aperture adjusting device 201 shown in FIGS. 10A and 10B in that a second substrate 252 includes a through hole on a center portion thereof. The second fluid F2 transmitting the light is disposed on a center portion of the chamber region so as to flow along with the through hole formed in the second substrate 252, and the first fluid F1 blocking or absorbing the light is disposed on a side portion of the chamber region.

A first electrode unit 360 is formed on a lower portion of the channel region, that is, an upper surface of the first substrate 210, and includes one or more electrodes e. In addition, a dielectric layer d covers the first electrode unit 360. The electrodes e included in the first electrode unit 360 may be arranged as shown in FIGS. 4A through 4E, or in other various modified structures. In addition, one or more electrodes may be disposed on an upper portion of the channel region, for example, a lower surface of a second substrate 252. According to the electrode to which the voltage is applied, the first fluid F1 blocking or absorbing the light and having the polar property flows from the channel region to the reservoir region between the second substrate 252 and the barrier wall 231, or from the reservoir region to the channel region. Accordingly, the interface between the first and second fluids F1 and F2 is moved to adjust the aperture.

Figure 12A:
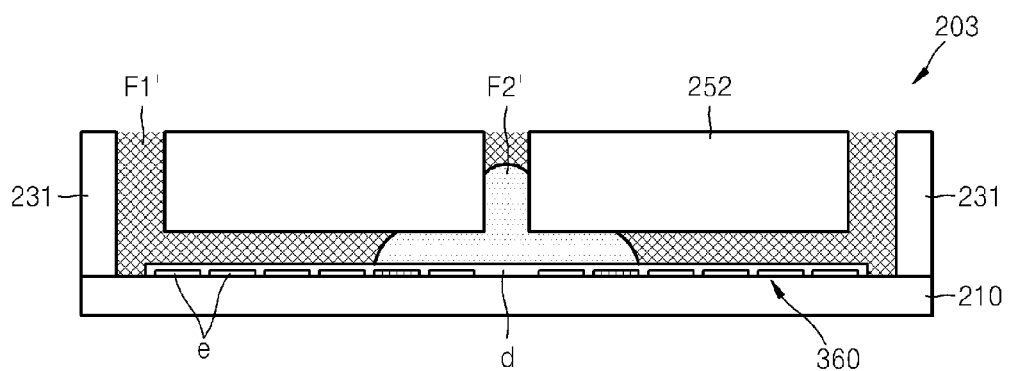
FIGS. 12A and 12B are schematic cross-sectional views of an aperture adjusting device according to another exemplary embodiment, in which apertures of different sizes are formed.
Figure 12B:
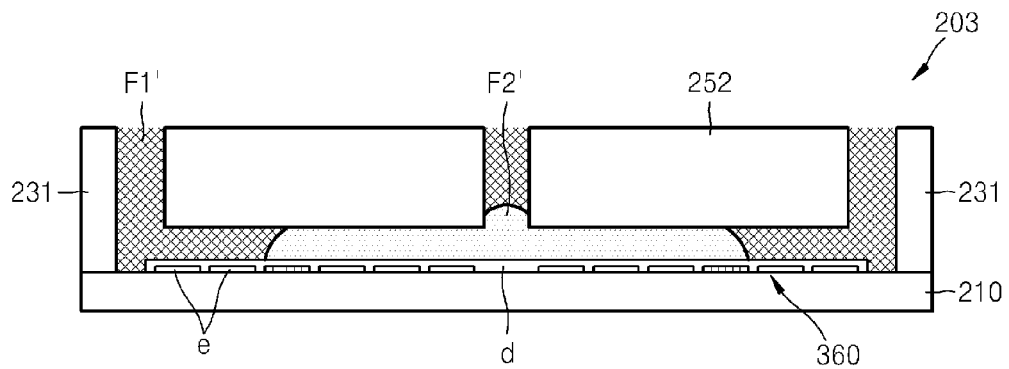

FIGS. 12A and 12B are schematic cross-sectional views of an aperture adjusting device 203 according to another embodiment of the present invention, and show apertures of different sizes.

The aperture adjusting device 203 of the present embodiment is different from the aperture adjusting device 202 shown in FIGS. 11A and 11B in that a second fluid F2' disposed on the center portion of the chamber region is a polar fluid and a first fluid F1' blocking or absorbing the light is a non-polar fluid. That is, according to the electrode to which the voltage is applied, the second fluid F2' transmitting the light and having the polar property flows from the channel region to the reservoir region in the through hole of the second substrate 252, or from the reservoir region to the channel region. Accordingly, the location of the interface between the first and second fluids F1' and F2' is moved so as to adjust the aperture.

The aperture adjusting devices 200, 201, 202, and 203 shown in FIGS. 8A through 12B respectively include one channel region. Hereinafter, according to embodiments shown in FIGS. 13A through 18B, an aperture adjusting device includes two channels connected to each other. In the embodiments of FIGS. 13A through 18B, a chamber providing the fluid with a flow space includes a first channel and a second channel connected to the first channel on an upper portion of the first channel, and the aperture is adjusted by changes in interfacial locations between the first and second fluids respectively in each of the first channel and the second channel.

Figure 13A:
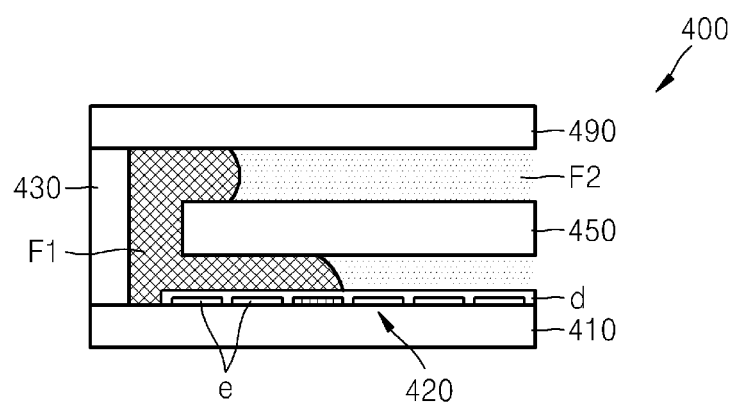
FIGS. 13A and 13B are schematic cross-sectional views of an aperture adjusting device according to another exemplary embodiment, in which apertures of different sizes are formed.
Figure 13B:
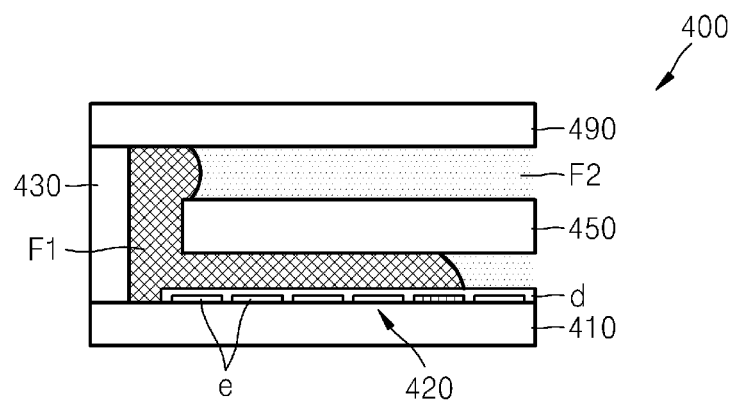

FIGS. 13A and 13B are schematic cross-sectional views of an aperture adjusting device 400 according to another exemplary embodiment, and show apertures of different sizes.

In the aperture adjusting device 400, the chamber that provides the fluids with the flow space includes a first substrate 410 on which a first electrode unit 420 is disposed, a second substrate 450 facing the first substrate 410 and separated from the first substrate 410 in a predetermined direction, a third substrate 490 facing the second substrate 450 and separated from the second substrate 450 in the predetermined direction, and a barrier wall 430 surrounding at least a side of a space formed between the first substrate 410 and the third substrate 490 and separated from the second substrate 450.

A space between the first substrate 410 and the second substrate 450 is the first channel and a space between the second substrate 450 and the third substrate 490 is the second channel. A height of the second channel may be equal to or higher than that of the first channel.

According to a voltage applied to one or more of the electrodes e included in a first electrode unit 420, the interface between the first fluid F1 and the second fluid F2 is moved so as to adjust the aperture.

Figure 14A:
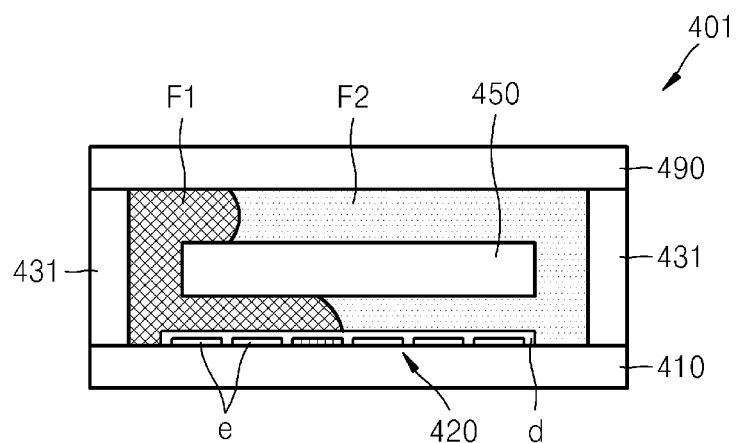
FIGS. 14A and 14B are schematic cross-sectional views of an aperture adjusting device according to another exemplary embodiment, in which apertures of different sizes are formed.
Figure 14B:
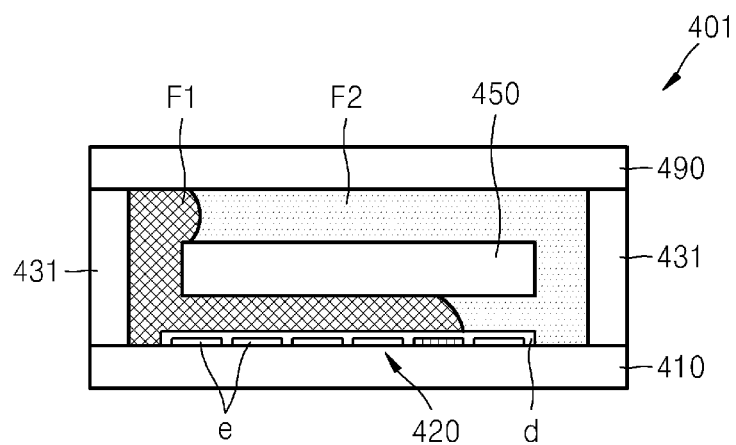

FIGS. 14A and 14B are cross-sectional views of an aperture adjusting device 401 according to another exemplary embodiment, and show apertures of different sizes.

The aperture adjusting device 401 of the present embodiment is different from the aperture adjusting device 400 of FIGS. 13A and 13B in that a barrier wall 431 surrounds side portions of the second substrate 450 along boundaries of the first substrate 410 and the third substrate 490.

Figure 15A:
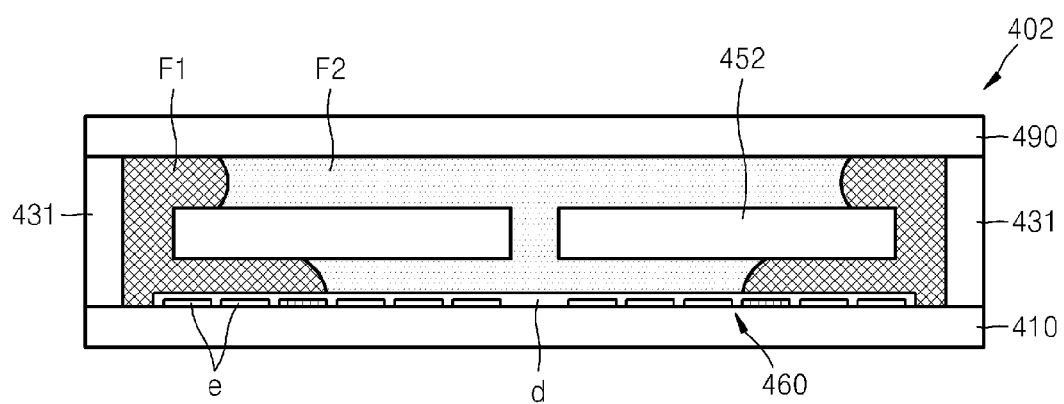
FIGS. 15A and 15B are schematic cross-sectional views of an aperture adjusting device according to another exemplary embodiment, in which apertures of different sizes are formed.
Figure 15B:
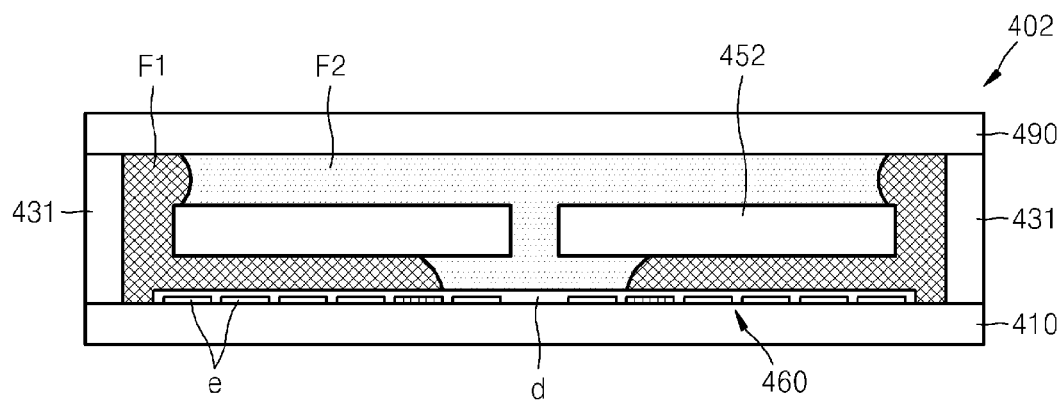

FIGS. 15A and 15B are schematic cross-sectional views of an aperture adjusting device 402 according to another exemplary embodiment, and show apertures of different sizes.

The aperture adjusting device 402 of the present embodiment is different from the aperture adjusting device 401 of FIGS. 14A and 14B in that a second substrate 252 includes a through hole in a center portion thereof. The second fluid F2 transmitting the light is disposed in a center portion of the chamber region so as to flow through the through hole formed in the second substrate 452, and the first fluid F1 blocking or absorbing the light is disposed in a side portion of the chamber region.

A first electrode unit 460 is formed on a lower portion of the first channel, that is, on an upper surface of the first substrate 410, and includes one or more electrodes e. In addition, a dielectric layer d covers the first electrode unit 460. The electrodes e in the first electrode unit 460 may be arranged as shown in FIGS. 4A through 4E, or in other various modified arrangements. In addition, one or more electrodes may be disposed on an upper portion of the first channel, for example, a lower surface of the second substrate 452, and one or more electrodes may be further disposed on a lower portion of the second channel, for example, on an upper surface of the second substrate 452.

According the voltage applied to one or more of the electrodes e, the first fluid F1 blocking or absorbing the light and having the polar property flows from the first channel to the second channel, or from the second channel to the first channel through paths along both edges of the chamber region. Accordingly, the location of the interface between the first fluid F1 and the second fluid F2 is moved so as to adjust the aperture.

Figure 16A:
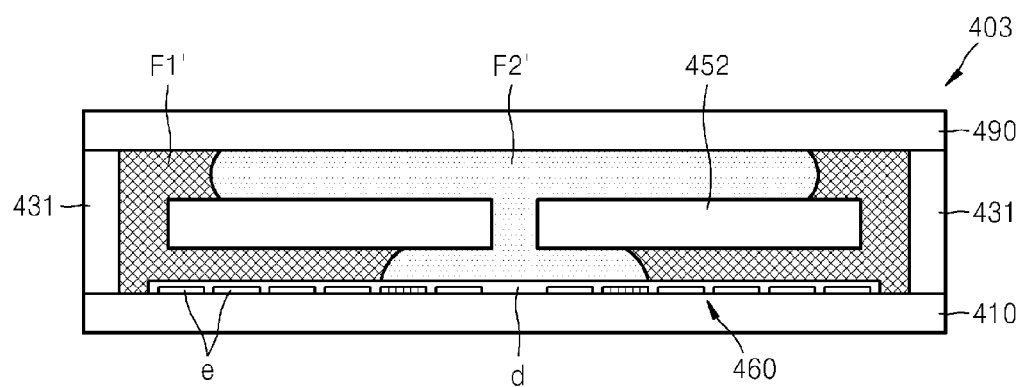
FIGS. 16A and 16B are schematic cross-sectional views of an aperture adjusting device according to another exemplary embodiment, in which apertures of different sizes are formed.
Figure 16B:
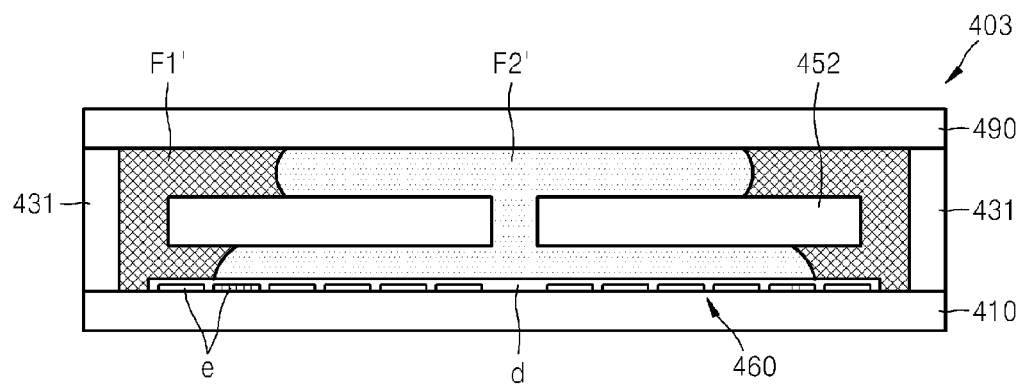

FIGS. 16A and 16B are schematic cross-sectional views of an aperture adjusting device 403 according to another exemplary embodiment, and show apertures of different sizes.

The aperture adjusting device 403 of the present embodiment is different from the aperture adjusting device 402 of FIGS. 15A and 15B in that a second fluid F2' transmitting the light and disposed in the center portion of the chamber region is the polar fluid and the first fluid F1' blocking or absorbing the light is the non-polar fluid. That is, according to the voltage applied to one or more of the electrodes e, the second fluid F2' transmitting the light and having the polar property flows from the first channel to the second channel, or from the second channel to the first channel through the through hole. Accordingly, the location of the interface between the first and second fluids F1' and F2' is moved so as to adjust the aperture.

In the aperture adjusting devices 200, 201, 202, 203, 400, 401, 402, and 403 shown in FIGS. 8A through 16B, the electrode unit is disposed on the lower portion of the channel; however, an additional electrode unit may be further disposed. For example, an electrode unit may be disposed on an upper portion of the channel, and an electrode unit may be disposed on an upper portion of the first channel and/or an upper portion of the second channel and/or a lower portion of the second channel in the two-channel structure. In addition, a grounding electrode unit may be further provided. For example, the grounding electrode unit may be disposed to maintain a contact state with the polar fluid at one or more portions in the chamber.

The above-described aperture adjusting devices 100, 101, 102, 103, 200, 201, 202, 203, 400, 401, 402, and 403 have a simple structure that does not need an external driving pump or a mechanical device, and thus, may be easily fabricated. In addition, in a structure including the two channels connected to each other, the aperture adjusting speed is fast with low power consumption since the electrowetting phenomenon is performed in both channels.

The aperture adjusting devices 100, 101, 102, 103, 200, 201, 202, 203, 400, 401, 402, and 403 according to exemplary embodiments may be used as variable apertures or optical shutters in medical imaging devices or imaging apparatuses such as cameras, and may be used as display devices.

Figure 17:
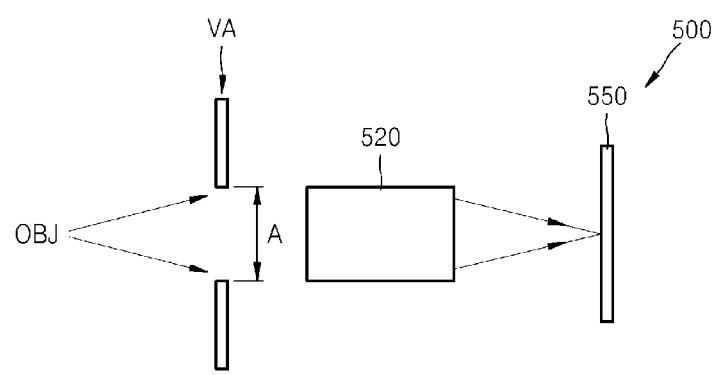
FIG. 17 is a schematic diagram of an imaging apparatus according to an exemplary embodiment.

FIG. 17 is a schematic diagram of an imaging apparatus 500 according to an exemplary embodiment.

The imaging apparatus 500 includes a variable aperture VA having an aperture A, to which light from an object OBJ is incident, of a variable size, a focusing unit 520 forming an image of the object OBJ from the light incident through the variable aperture VA, and an imaging device 550 converting the image formed by the focusing unit 520 into an electric signal.

The variable aperture VA may be one of the above described aperture adjusting devices 100, 101, 102, 103, 200, 201, 202, 203, 400, 401, 402, and 403, and the focusing unit 520 may include one or more lenses. The imaging device 550 may be a charge-coupled device (CCD) or a complementary metal-oxide semiconductor (CMOS).

The variable aperture VA may be finely driven at a high speed since the variable aperture VA is a microelectrofluidic type, and thus, the imaging apparatus 500 including the variable aperture VA may be used as a medical image device such as an optical coherence tomography (OCT) device or a microscope.

Figure 18:
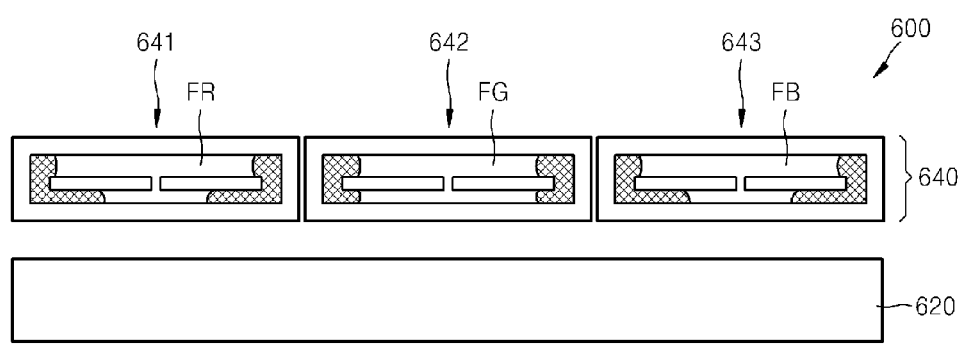
FIG. 18 is a schematic cross-sectional view of an image display apparatus according to an exemplary embodiment.

FIG. 18 is a schematic cross-sectional view of an image display apparatus 600 according to an exemplary embodiment.

The image display apparatus 600 includes a light source unit 520 providing light for forming images, and a display panel 640 adjusting a transmittance of the light emitted from the light source unit 620 according to image information.

The display panel 640 may include a structure in which a plurality of the aperture adjusting devices 100, 101, 102, 103, 200, 201, 202, 203, 400, 401, 402, or 403 are arranged to form an array. For example, the display panel 640 may include a first device 641, a second device 642, and a third device 643. The first device 641 is one of the above-described aperture adjusting devices, and includes a light transmitting fluid FR representing a first color. The second device 642 is one of the above-described aperture adjusting devices, and includes a light transmitting fluid FG representing a second color. In addition, the third device 643 is one of the above-described aperture adjusting devices, and includes a light transmitting fluid FB representing a third color. The first, second, and third colors may be red, green, and blue, respectively. Each of the first, second, and third devices 641, 642, and 643 may transmit or block the light emitted from the light source unit 620 because the driving of the electrode unit is controlled according to the image information, and may represent a gray level by adjusting the aperture in a transmission mode.

Figure 19:
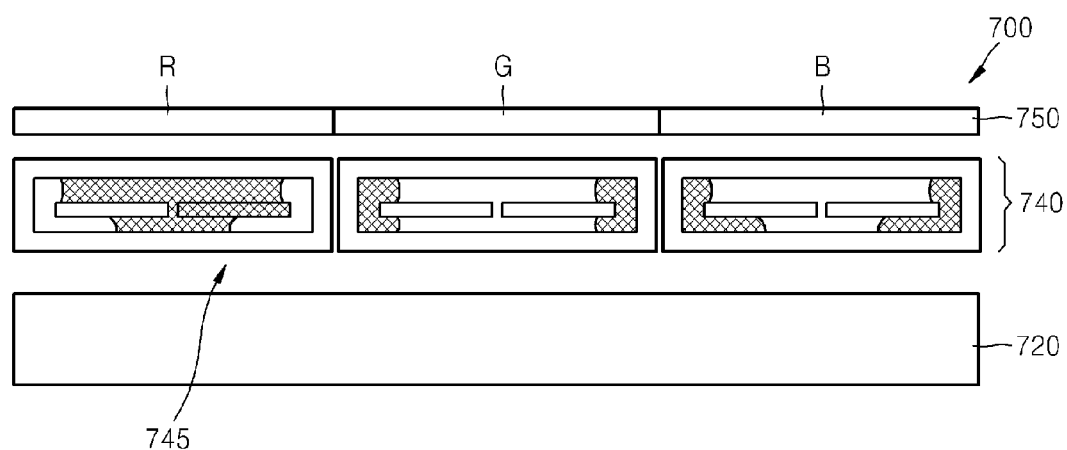
FIG. 19 is a schematic cross-sectional view of an image display apparatus according to another exemplary embodiment.

FIG. 19 is a schematic cross-sectional view of an image display apparatus 700 according to another exemplary embodiment.

The image display apparatus 700 includes a light source unit 720 providing light for forming images, and a display panel 740 adjusting a transmittance of the light emitted from the light source unit 720 according to image information. The display panel 740 may include an array in which a plurality of aperture adjusting devices 745 are arranged. The aperture adjusting device 745 may be one of the above described aperture adjusting devices 100, 101, 102, 103, 200, 201, 202, 203, 400, 401, 402, and 403, or a modified example thereof. The image display apparatus 700 of the present embodiment is different from the image display apparatus 600 of FIG. 8 in that a color filter 750 for representing colors is additionally formed. That is, the color filter 750 including color regions R, G, and B which respectively correspond to the plurality of aperture adjusting devices 745 is disposed on an upper portion of the display panel 740.

Each of the aperture adjusting devices 745 may transmit or block the light emitted from the light source unit 720 because the driving of the electrode unit is controlled according to the image information, and may represent a gray level by adjusting the aperture in a transmission mode so as to adjust the intensity of the light incident into the color regions R, G, and B of the color filter 750.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in forms and details may be made to the exemplary embodiments described herein without departing from the spirit and scope of the present inventive concept as defined by the following claims

What is claimed is:

1. An aperture adjusting device comprising:
   a chamber;
   a first fluid and a second fluid disposed in the chamber, wherein the first fluid and the second fluid are not mixed with each other and wherein the first fluid is a light transmitting fluid and the second fluid is a light blocking or absorbing fluid; and a first electrode unit, disposed on an inner surface of the chamber, comprising one or more electrodes to which a voltage may be applied to form an electric field in the chamber;

wherein an aperture within the chamber through which light is transmittable is adjustable by adjusting an interfacial location between the first fluid and the second fluid by modifying the electric field;

wherein the chamber defines an interior space within which the first fluid and the second fluid are disposer, the interior space comprising:
 a channel region, wherein the aperture is defined according to a change of the interfacial location within the channel region; and
 a reservoir region which stores at least one of the first fluid and the second fluid moved from the channel region according to the change of the interfacial location; and wherein the chamber comprises:
 a first substrate on which the first electrode unit is disposed;
 a second substrate facing the first substrate and separated from the first substrate in a first direction; and
 a barrier wall disposed on the first substrate and separated from the second substrate in a second direction different from the first direction.

2. The aperture adjusting device of claim 1, wherein one of the first fluid and the second fluid is a liquid metal or a polar liquid, and another of the first fluid and the second fluid is a vapor or a non-polar liquid.

3. The aperture adjusting device of claim 1, wherein the barrier wall faces a lateral side of the second substrate.

4. The aperture adjusting device of claim 1, further comprising a second electrode unit disposed on the second substrate facing the first electrode unit, wherein the second electrode unit comprises one or more electrodes.

5. The aperture adjusting device of claim 1, wherein the second substrate comprises a through hole in a center portion thereof.

6. The aperture adjusting device of claim 5, wherein the first fluid is disposed in a center portion of the channel region and flows through the through hole, and the second fluid is disposed in a peripheral portion of the channel region.

7. The aperture adjusting device of claim 5, wherein the first electrode unit comprises a plurality of loop electrodes.

8. An imaging apparatus comprising:
an aperture adjusting device according to claim 1;
a focusing unit which focuses an image of an object from light incident through the aperture adjusting device; and
an imaging device which converts the image formed by the focusing unit into an electric signal.

9. An image display apparatus comprising:
a light source which emits light; and
a display panel which adjusts a transmittance of the light emitted from the light source unit according to image information, wherein the display panel comprises an array of a plurality of aperture adjusting devices, wherein each of the aperture adjusting devices is the aperture adjusting device of claim 1.

10. The image display apparatus of claim 9, wherein the plurality of aperture adjusting devices comprises:
a first aperture adjusting device in which the first fluid is a first color;
a second aperture adjusting device in which the first fluid is a second color different from the first color; and
a third aperture adjusting device in which the first fluid is a third color different from the first color and the second color.

11. The image display apparatus of claim 9, further comprising a color filter disposed on a light output face of the display panel, the color filter comprising a plurality of color regions corresponding to the plurality of aperture adjusting devices.

12. An aperture adjusting device comprising:
a chamber;
a first fluid and a second fluid disposed in the chamber, wherein the first fluid and the second fluid are not mixed with each other and wherein the first fluid is a light transmitting fluid and the second fluid is a light blocking or absorbing fluid; and
a first electrode unit, disposed on an inner surface of the chamber, comprising one or more electrodes to which a voltage may be applied to form an electric field in the chamber;
wherein an aperture within the chamber through which light is transmittable is adjustable by adjusting an interfacial location between the first fluid and the second fluid by modifying the electric field;
wherein the chamber defines an interior space within which the first fluid and the second fluid are disposed, the interior space comprising:
 a first channel; and
 a second channel connected to the first channel at an upper portion of the first channel,
 wherein a range of the aperture is defined by a change of the interfacial location between the first fluid and the second fluid in each of the first channel and the second channel;
wherein the chamber comprises:
 a first substrate on which the first electrode unit is disposed;
 a second substrate facing the first substrate and separated from the first substrate in a predetermined direction;
 a third substrate facing the second substrate and separated from the second substrate in the predetermined direction; and
 a barrier wall facing at least a lateral side of the second substrate and separated from the second substrate.

13. The aperture adjusting device of claim 12, wherein a height of the second channel is equal to or greater than a height of the first channel.

14. The aperture adjusting device of claim 12, wherein the barrier wall forms an outer lateral wall of the chamber, contacting the first substrate and the third substrate.

15. The aperture adjusting device of claim 14, wherein the second substrate comprises a through hole formed in a center portion thereof.

16. The aperture adjusting device of claim 15, wherein the first fluid is disposed in a center portion of the channel region and flows through the through hole, and the second fluid is in a peripheral portion of the channel region.

17. An aperture adjusting device comprising:
a chamber;
a first fluid and a second fluid disposed in the chamber, wherein the first fluid and the second fluid are not mixed with each other and wherein the first fluid is a light transmitting fluid and the second fluid is a light blocking or absorbing fluid; and a first electrode unit, disposed on an inner surface of the chamber, comprising one or more electrodes to which a voltage may be applied to form an electric field in the chamber;

wherein an aperture within the chamber through which light is transmittable is adjustable by adjusting an interfacial location between the first fluid and the second fluid by modifying the electric field;

wherein the chamber defines an interior space within which the first fluid and the second fluid are disposed, the interior space comprising:
 a first channel; and
 a second channel connected to the first channel at an upper portion of the first channel:

wherein the first channel is defined by:
 a first substrate on which the first electrode unit is disposed;
 a second substrate separated from the first substrate, and comprising a first through hole in a center portion thereof and at least one second through hole in a peripheral portion thereof; and
 a first spacer disposed between the first substrate and the second substrate.

18. The aperture adjusting device of claim 17, wherein the second channel is defined by:
 the second substrate,
 a third substrate separated from the second substrate, and
 a second spacer disposed between the second substrate and the third substrate.

19. The aperture adjusting device of claim 18, wherein the first electrode unit comprises one or more loop electrodes.

20. The aperture adjusting device of claim 18, further comprising a first dielectric layer covering the first electrode unit.

21. The aperture adjusting device of claim 18, further comprising a second electrode unit, disposed on the third substrate, comprising one or more electrodes.

22. The aperture adjusting device of claim 21, further comprising a second dielectric layer covering the second electrode unit.

23. The aperture adjusting device of claim 21, wherein the second electrode unit comprises one or more loop electrodes.

24. The aperture adjusting device of claim 18, further comprising an opaque pattern unit, at least a portion of which blocks light transmitted through the first channel and the second channel, disposed on a center portion of the third substrate.

25. The aperture adjusting device of claim 24, wherein the opaque pattern unit comprises a light blocking portion having a size corresponding to a minimum size of the aperture that is defined by movement of the interfacial location between the first fluid and the second fluid.

26. The aperture adjusting device of claim 18, further comprising a grounding electrode unit contacting a polar fluid of the first fluid and the second fluid and disposed within in a space defined by the first channel and the second channel.

27. The aperture adjusting device of claim 26, wherein the grounding electrode unit is disposed on the first substrate.

28. The aperture adjusting device of claim 18, further comprising a third electrode unit comprising one or more electrodes disposed on the second substrate.

29. The aperture adjusting device of claim 18, further comprising a third electrode comprising one or more electrodes and disposed on a first surface of the second substrate, and a fourth electrode unit comprising one or more electrodes and disposed on a second surface of the second substrate, opposite the first surface of the second substrate.

30. The aperture adjusting device of claim 29, further comprising a third dielectric layer covering the third electrode unit, and a fourth dielectric layer covering the fourth electrode unit.

31. An aperture adjusting method comprising:
 disposing a first fluid and a second fluid in a chamber such that the first fluid and the second fluid are not mixed with each other, wherein the first fluid transmits light and the second fluid blocks or absorbs light and wherein an electrode unit, comprising one or more electrodes arranged in an array, is disposed in the chamber; and
 selectively applying a voltage to at least one of the one or more electrodes, thereby adjusting an aperture through which light is transmitted by moving an interface between the first fluid and the second fluid;

wherein the chamber defines an interior space within which the first fluid and the second fluid are disposed, the interior space comprising:
 a first channel; and
 a second channel connected to the first channel at an upper portion of the first channel,
 wherein the range of the aperture is defined by a movement of the interface between the first fluid and the second fluid in each of the first channel and the second channel, and
 wherein a path connecting the first and second channels to each other comprises at least one through hole disposed at a center portion of the chamber and at least one through-hold disposed at a peripheral portion of the chamber.

32. The aperture adjusting method of claim 31, wherein the chamber defines an interior space within which the first fluid and the second fluid are disposed, the interior space comprising:
 a channel region, wherein the aperture is defined according to a movement of the interface within the channel region; and
 a reservoir region which stores at least one of the first fluid and the second fluid moved from the channel region according to the movement of the interface.

33. The aperture adjusting method of claim 32, wherein the electrode unit comprises a first electrode unit, disposed on a lower portion of the channel region and including one or more electrodes.

34. The aperture adjusting method of claim 33, wherein the electrode unit further comprises a second electrode unit disposed on an upper portion of the channel region and including one or more electrodes.

35. The aperture adjusting method of claim 31, wherein a height of the second channel is equal to or higher than a height of the first channel.

36. The aperture adjusting method of claim 31, wherein the electrode unit comprises:
 a first electrode unit disposed on a lower portion of the first channel and including one or more electrodes; and
 a second electrode unit disposed on an upper portion of the second channel and including one or more electrodes.

37. The aperture adjusting method of claim 36, wherein the electrode unit further comprises a third electrode unit disposed on an upper portion of the first channel and including one or more electrodes.

38. The aperture adjusting method of claim 36, wherein the electrode unit further comprises a fourth electrode unit disposed on a lower portion of the second channel and including one or more electrodes.

39. The aperture adjusting method of claim 31, wherein one of the first fluid and the second fluid is liquid metal or polar liquid, and another of the first fluid and the second fluid is vapor or a non-polar liquid.

* * * * *